United States Patent
Jerabek et al.

(10) Patent No.: US 11,832,721 B2
(45) Date of Patent: Dec. 5, 2023

(54) STRUCTURAL SYSTEM AND SHELF

(71) Applicant: VISPLAY GMBH, Weil am Rhein (DE)

(72) Inventors: Harald Jerabek, Neuenburg (DE); Marco Sander, Im Schwarzenbach (DE)

(73) Assignee: VISPLAY GMBH, Weil am Rhein (DE)

( * ) Notice: Subject to any disclaimer, the term of this patent is extended or adjusted under 35 U.S.C. 154(b) by 0 days.

(21) Appl. No.: 17/794,375

(22) PCT Filed: Jan. 25, 2021

(86) PCT No.: PCT/EP2021/051583
§ 371 (c)(1),
(2) Date: Jul. 21, 2022

(87) PCT Pub. No.: WO2021/148669
PCT Pub. Date: Jul. 29, 2021

(65) Prior Publication Data
US 2023/0047733 A1 Feb. 16, 2023

(30) Foreign Application Priority Data
Jan. 23, 2020 (CH) .................................. 00073/20

(51) Int. Cl.
*A47B 57/54* (2006.01)
*A47B 47/00* (2006.01)
(Continued)

(52) U.S. Cl.
CPC ........ *A47B 57/545* (2013.01); *A47B 47/0083* (2013.01); *A47B 57/48* (2013.01); *A47B 96/021* (2013.01)

(58) Field of Classification Search
CPC ... A47B 57/545; A47B 47/0083; A47B 57/48; A47B 96/02; A47B 96/06; A47B 96/021;
(Continued)

(56) References Cited

U.S. PATENT DOCUMENTS 3,202,296 A * 8/1965 Diack ................. E04F 11/1851
211/186
3,479,975 A * 11/1969 Handler ................. A47B 57/20
403/403
(Continued)

FOREIGN PATENT DOCUMENTS

EP       0262090 A1    3/1988
KR    20070107919 A   11/2007
(Continued)

OTHER PUBLICATIONS

International Search Report and Written Opinion issued Mar. 16, 2021 in Intl Appl. No. PCT/EP2021/051583.

*Primary Examiner* — Jennifer E. Novosad
(74) *Attorney, Agent, or Firm* — MEDLER FERRO WOODHOUSE & MILLS PLLC

(57) ABSTRACT

A structural system for the modular construction of shelves includes a set of elongate vertical supports, a set of frames and a set of connectors. The vertical supports have at least one axially extending row of holes, the frames have four struts, and the connectors are designed to be introduced into a hole a vertical support and secured to a mounting corner piece of a frame. The structural system is designed such that, in an assembled state, a frame of the set of frames is secured by its mounting corner pieces to four vertical supports via a relevant connector, two respective neighboring vertical supports that are connected to one another via one of the struts of the at least one frame define a support plane, and the four
(Continued)

struts of the at least one frame lie outside the support planes defined by the four vertical supports connected to the frame.

21 Claims, 5 Drawing Sheets

(51) Int. Cl.
*A47B 57/48* (2006.01)
*A47B 96/02* (2006.01)

(58) Field of Classification Search
CPC ..... A47B 96/024; A47B 96/063; A47B 57/26; A47B 57/265; A47B 57/40; A47B 57/402; A47B 57/44; A47B 57/541; A47B 96/1408; A47B 96/022; A47B 96/068; A47B 57/06; A47B 57/16; A47B 57/18; A47B 57/20; A47B 57/30; A47B 57/32; A47B 57/408; A47B 57/406; A47B 57/482; A47B 96/14
USPC ............ 211/187, 190, 191, 192; 108/147.13, 108/147.14, 147.15, 147.16, 147.17, 108/147.11; 248/235, 218.4, 243–245, 248/250
See application file for complete search history.

(56) References Cited

U.S. PATENT DOCUMENTS

| | | | | | |
|---|---|---|---|---|---|
| 3,675,598 | A | * | 7/1972 | Kesilman | A47B 57/26 108/106 |
| 4,230,052 | A | * | 10/1980 | Champagne | F16B 12/02 108/147.14 |
| 4,250,679 | A | * | 2/1981 | Burg | F16B 12/28 52/654.1 |
| 4,257,333 | A | * | 3/1981 | Pollack | A47B 57/265 108/62 |
| 4,592,286 | A | * | 6/1986 | Trubiano | A47B 57/545 211/208 |
| 4,637,323 | A | * | 1/1987 | Nicely | A47B 57/26 108/147.14 |
| 4,706,576 | A | * | 11/1987 | James | A47B 57/545 108/106 |
| 4,811,670 | A | * | 3/1989 | Kolvites | A47B 57/265 211/187 |
| 4,815,394 | A | * | 3/1989 | Ettlinger | A47B 57/265 108/107 |
| 4,852,501 | A | * | 8/1989 | Olson | A47B 57/265 108/107 |
| 4,892,044 | A | * | 1/1990 | Welsch | F16B 9/05 108/147.14 |
| 4,996,929 | A | * | 3/1991 | Saal | A47B 47/021 211/187 |
| 5,415,302 | A | * | 5/1995 | Carlson | A47B 57/265 211/187 |
| 5,423,251 | A | * | 6/1995 | Kolvites | A47B 57/545 108/193 |
| 5,531,167 | A | * | 7/1996 | Stevens | F16B 12/32 108/106 |
| 5,960,968 | A | * | 10/1999 | Wang | A47B 17/03 211/187 |
| 6,113,042 | A | * | 9/2000 | Welsch | A47B 57/265 211/187 |
| 6,158,600 | A | * | 12/2000 | Ferrucci | A47F 5/13 211/90.03 |
| 6,273,281 | B1 | * | 8/2001 | Berglund | A47B 57/50 108/147.11 |
| 6,302,284 | B1 | * | 10/2001 | Zonshin | A47B 47/0083 108/147.11 |
| 6,364,138 | B1 | * | 4/2002 | Chen | A47B 57/26 211/187 |
| 6,407,332 | B1 | * | 6/2002 | Buchberger | H05K 7/183 361/826 |
| 6,920,831 | B2 | * | 7/2005 | Lin | A47B 57/408 211/187 |
| 6,971,528 | B2 | * | 12/2005 | Chen | A47B 57/40 211/187 |
| 7,059,484 | B1 | * | 6/2006 | Goldberg | A47B 47/0083 211/187 |
| 8,016,140 | B2 | * | 9/2011 | Hsieh | A47B 47/0083 211/187 |
| 8,042,477 | B2 | * | 10/2011 | Lee | A47B 57/54 108/147.12 |
| 8,286,564 | B2 | * | 10/2012 | Karl | A47B 57/545 108/107 |
| 8,640,893 | B2 | * | 2/2014 | Kessell | A47B 57/545 211/187 |
| 8,678,207 | B2 | * | 3/2014 | Shimazaki | A47B 57/545 211/208 |
| 9,148,977 | B1 | * | 9/2015 | Williams | A47B 47/021 |
| 10,299,589 | B1 | * | 5/2019 | Lai | A47B 57/408 |
| 10,455,935 | B1 | * | 10/2019 | Chen | A47B 47/027 |
| 2003/0085191 | A1 | * | 5/2003 | Nakajima | A47B 13/06 211/186 |
| 2006/0144805 | A1 | * | 7/2006 | Wang | A47B 96/024 211/37 |
| 2007/0062898 | A1 | * | 3/2007 | Choi | A47B 57/408 211/187 |
| 2007/0110511 | A1 | * | 5/2007 | Chen | A47B 57/40 403/230 |
| 2009/0152225 | A1 | * | 6/2009 | Lee | A47B 47/024 108/106 |
| 2013/0055604 | A1 | * | 3/2013 | Herman Baran | A47B 45/00 40/606.03 |
| 2016/0007739 | A1 | * | 1/2016 | Shinozaki | A47B 57/34 211/187 |
| 2016/0015175 | A1 | * | 1/2016 | Wu | A47B 47/02 211/187 |
| 2016/0198847 | A1 | * | 7/2016 | Fu | A47B 47/0083 211/187 |
| 2021/0372448 | A1 | * | 12/2021 | Yang | F16B 12/44 |
| 2023/0047733 | A1 | * | 2/2023 | Jerabek | A47B 96/021 |

FOREIGN PATENT DOCUMENTS

| | | | | |
|---|---|---|---|---|
| WO | 97/00033 A1 | 1/1997 | | |
| WO | 01/37706 A1 | 5/2001 | | |
| WO | WO-2021148669 A1 | * | 7/2021 | ............ A47B 45/00 |
| WO | WO-2021148671 A1 | * | 7/2021 | ............ A47B 45/00 |

* cited by examiner

STRUCTURAL SYSTEM AND SHELF

TECHNICAL FIELD

The invention relates to a structural system for the modular construction of shelves and to a shelf constructed from such a structural system.

BACKGROUND

In order to flexibly assemble furniture, systems are known in which furniture can be variably constructed from basic components. Variable modular furniture systems are widespread in particular in goods stores or in offices, where the furniture or the requirements for the furniture typically change from time to time.

Known variable modular furniture systems are frequently based on a three-dimensional supporting tube structure that can be constructed in various ways. For example, EP 0 262 090 A1 describes a furniture structure which has a plurality of tubes that can be connected via node elements. In this system, the tubes can be assembled in various ways by means of the node elements, and in particular frames can be created in various shapes. The connected tubes can also be equipped with screens and single shelves that are mounted between the tubes.

In modern shops or at trade fairs, among other things, there is an increasing need nowadays to frequently and comprehensively adjust the furniture. Despite their variability, known modular furniture systems are disadvantageous because they have to be dismantled and reassembled in a complex manner. This reassembly is typically carried out by trained persons using special tools. This is necessary for safety reasons, among other things, since the modular furniture system must ensure that the furniture created therewith is sufficiently stable. Unstable furniture can pose a significant risk to persons, in particular in the case of comparatively high and/or heavily loaded furniture.

Since, with the known modular furniture systems, assembling, reassembling and disassembling furniture is, as mentioned above, complex and can pose a safety risk if done improperly, nowadays it is typical to refrain from adjusting the furniture to changing needs.

The object of the following invention is therefore to propose a system with which it is possible in a simple manner, without tools or exclusively with conventional simple tools, to flexibly create or reassemble furniture that is sufficiently robust and safe such that it is suitable for offices or shops, for example. In particular, the system should make it possible to assemble, reassemble and disassemble shelves or frames flexibly, efficiently and safely.

DESCRIPTION OF THE INVENTION

The object is achieved according to the invention by a structural system as defined in independent claim 1 and by a shelf as defined in independent claim 21. Advantageous design variants of the invention can be found in the dependent claims.

The essence of the invention is as follows: A structural system for the modular construction of shelves comprises a set of elongate vertical supports, a set of frames and a set of connectors. The vertical supports each have at least one axially extending row of holes. The frames each have four struts, of which two are connected to one another via a mounting corner piece. The connectors are each designed to be introduced into a hole of one of the vertical supports and secured to one of the mounting corner pieces of one of the frames. The structural system is designed such that, in an assembled state, at least one frame of the set of frames is secured by its mounting corner pieces to four vertical supports via a relevant connector, two respective neighboring vertical supports that are connected to one another via one of the struts of the at least one frame define a support plane, and that the four struts of the at least one frame lie outside the support planes defined by the four vertical supports connected to the frame.

The structural system can in particular relate to a system for the modular construction of shelves. It can be provided for the flexible assembly, reassembly, expansion and disassembly of shelves or similar furniture as required with components of various sizes and designs. The structures or shelves or similar furniture constructed with the structural system can also be used for dividing or structuring a room. The structural system can also be referred to as a shelving kit.

The term "axial" in connection with the at least one row of holes relates in particular to an extension along the vertical support or along a longitudinal axis of the typically elongate vertical support. The holes are typically located at regular intervals from one another on a straight line that is parallel to or on the longitudinal axis of the vertical support.

The term "set" in connection with the structural system and its vertical supports, frames and connectors refers to a plurality of identical or similar elements or components. The set of vertical supports advantageously comprises at least four individual vertical supports so that a shelf can be constructed. The set of frames advantageously has at least two frames so that the shelf constructed therewith is sufficiently stable. The set of connectors advantageously comprises at least eight connectors to allow the at least two frames to be connected in a supporting manner to the vertical supports.

The support planes are each defined by the two neighboring vertical supports, since they both lie therein. In this context, the term "lying in the support plane" can refer to the fact that the longitudinal axes of the neighboring vertical supports or an edge of the neighboring vertical supports lie in one plane.

In connection with the invention, the term "lying outside the support plane" refers to the fact that the strut does not lie in the plane defined by the vertical supports which the strut interconnects. Such "lying outside the support plane" can be a positioning in relation to the shelf or piece of furniture built from the structural system to the outside or in particular to the inside.

Because the struts are outside of the support planes, it can be achieved that the struts do not have to be connected individually to the vertical supports, but entire frames can be secured to a plurality of vertical supports at the same time. This makes it easier and more efficient to assemble and reassemble a shelf or piece of furniture. In addition, this allows a comparatively stable construction. Furthermore, the versatility of the assembly options can be increased since the frames can protrude between two vertical supports and can be connected to other vertical supports.

The vertical supports are aligned more or less vertically in a constructed state or in a state installed in a shelf. Correspondingly, the support planes also extend vertically in this state.

The frames can be designed to be more or less rectangular, in that each of the mounting corner pieces connects two struts to each other at right angles. All struts of a frame can be of the same length or two opposite struts can be shorter and two other opposite struts can be longer. "Rectangular" in the sense mentioned above can also be square.

The struts can be designed to be beam-like or tubular-like. In particular, they can be made of metal or a solid plastics material as square tubes, for example.

The mounting corner pieces can be designed as separate components that are each connected to two struts. For example, they can have two plug-in portions extending at right angles to one another, on each of which one of the struts is plugged.

The structural system according to the invention allows a flexible, modular design of furniture and in particular of shelves or shelf-like structures. In particular, stable shelving structures can be efficiently, flexibly and reversibly constructed, disassembled and reassembled from the components or parts of the structural system without tools or exclusively with conventional simple tools by untrained persons.

The mounting corner pieces of the frames preferably interconnect two struts more or less at right angles, so that the mounting corner piece defines an external angle of more or less 270°, and the mounting corner pieces each have a connection extension which extends more or less in the direction of a bisecting line of the external angle. With such connection extensions at the mounting corner pieces, the struts of the frame can be offset in an efficient manner, in particular inwardly, and thus lie outside the support planes. The connection extensions of a frame ensure that the struts are offset to the same extent and held securely and are therefore outside the support planes.

Preferably, the mounting corner pieces of the frames are each equipped with a receptacle designed for vertical introduction of one of the connectors. Such mounting corner pieces allow simple reversible hanging of the frames on the vertical supports. In particular, the frame can be pressed onto the connectors by gravity and thus be securely secured to the vertical supports. This allows the frames to be mounted and disassembled efficiently.

In a preferred embodiment, the receptacle is arranged on the connection extension. In this way, the receptacle can be easily accessible so that the frame can be secured to the connector easily and efficiently.

The frames are preferably designed to be secured to four of the vertical supports by a connector mounted on one of the vertical supports being introduced into the receptacle of one of the mounting corner pieces. In this way, the four vertical supports can be connected to one another. In particular, at least two frames can be secured to the four vertical supports for a stable shelf. This also prevents the shelf from tilting.

Preferably, the mounting corner pieces of at least two of the frames of the set of frames are each equipped with a clamping mechanism designed to clamp the associated frame to the vertical support to which it is secured via a connector. A high level of stability can be achieved via such clamping. In particular, two frames clamped with the four vertical supports can ensure sufficient strength, so that further frames only have to be placed thereon and not clamped.

Preferably, the frames of the set of frames are designed to be identical except for the length of the struts. The term "identical except for the length of the struts" in the context of the frames does not imply that the length of the struts cannot be identical. Rather, the struts of two frames can have the same or different lengths. The set of frames can thus have exactly identical frames or frames that are dimensioned to be larger or smaller. Even in a single frame, two parallel struts are typically identical in length, so that a rectangular or square shape can be created.

Preferably, the structural system comprises a set of single shelves, each adapted to be placed on one of the frames when mounted on vertical supports. The term "placing" in this context refers to any loose, fixed, connected or any other type of positioning of a single shelf on one of the frames. Such single shelves can be useful in many applications. In particular, they can be used to set up products or other goods. The single shelves can be made of various materials such as glass, wood, metal or plastics material. The material can be chosen from an aesthetic and/or functional point of view.

The single shelves are preferably each substantially rectangular. The term "rectangular" in the context of the single shelves also comprises square shapes. Such rectangular single shelves allow a simple and practical construction in many applications.

In this case, the single shelves preferably each comprise four corner pieces which are each designed to partially encompass one of the vertical supports. The corner pieces of the single shelves can each encompass about a quarter of the circumference of the associated vertical supports. Such single shelves make it possible to provide a comparatively large placement surface.

The struts of the frames are preferably equipped with a first alignment structure, and the single shelves are equipped with a second alignment structure, and the first alignment structures of the frames and the second alignment structures of the single shelves are designed so that the single shelves can be placed on the frames in a predefined position. In particular, the alignment structures can ensure that the single shelves can only be placed on the frames in the predefined position.

In this case, the first alignment structure preferably has a receptacle, and the second alignment structure has a projection matching the receptacle. The receptacle can be provided as an indentation, opening or bore in the associated strut. The projection can be designed as a corresponding curvature, as a pin, as a bolt or as something similar. Such a configuration of the first and second alignment structures allows the single shelves to be efficiently placed on the frames at the predefined positions. In addition, by means of such a configuration, it can be prevented that the single shelves are pushed or moved laterally or horizontally onto the frame. This can increase or ensure the safety of a shelf constructed from the structural system.

The connectors preferably each have a hook portion which is designed to be hooked into one of the holes of one of the vertical supports. Such a hook portion allows the connector to be secured to one of the vertical supports efficiently and securely. The frame can then be efficiently secured to the vertical support using the hooked-in connector.

Preferably, the set of vertical supports comprises at least one vertical support having a plurality of axially extending rows of holes. In particular, a plurality of rows of holes can be designed on different sides of the vertical support. Frames can be secured to the vertical support on different sides, which allows the construction of comparatively large or complex shelves or similar furniture.

Preferably, the set of vertical supports comprises at least one vertical support having a single row of holes extending along the vertical support. Such vertical supports can be desired, in particular for aesthetic reasons, at the ends of shelves or furniture or similar structures constructed from the structural system.

Alternatively or additionally, the set of vertical supports preferably comprises at least one vertical support having exactly two rows of holes extending along the vertical support.

Alternatively or additionally, the set of vertical supports preferably comprises at least one vertical support having exactly three rows of holes extending along the vertical support.

Alternatively or additionally, the set of vertical supports preferably comprises at least one vertical support having four rows of holes extending along the vertical support.

Advantageously, the set comprises different vertical supports with various numbers of rows of holes. In this way, the structural system can allow an extremely flexible construction of shelves and similar furniture in various configurations.

Preferably, the vertical supports each have a circular outer circumference in cross section. In particular, the cross section can be more or less at right angles to a longitudinal axis of the associated vertical support.

In this case, the vertical supports preferably each comprise a tubular body in the form of a round tube. Such vertical supports in the form of a round tube can have a comparatively high level of stability and appear comparatively slim, which can be desirable for aesthetic reasons.

In another aspect, the invention is a shelf constructed from a structural system as described above. Such a shelf allows the effects and advantages described above in connection with the structural system according to the invention and the preferred embodiments thereof to be implemented efficiently.

BRIEF DESCRIPTION OF THE DRAWINGS

Further advantageous embodiments of the invention result from the following description of embodiments of the invention with the aid of the schematic drawings. In particular, the structural system according to the invention and the shelf according to the invention are described in more detail below with reference to the accompanying drawings by means of embodiments.

EMBODIMENT(S) OF THE INVENTION

Figure 1:
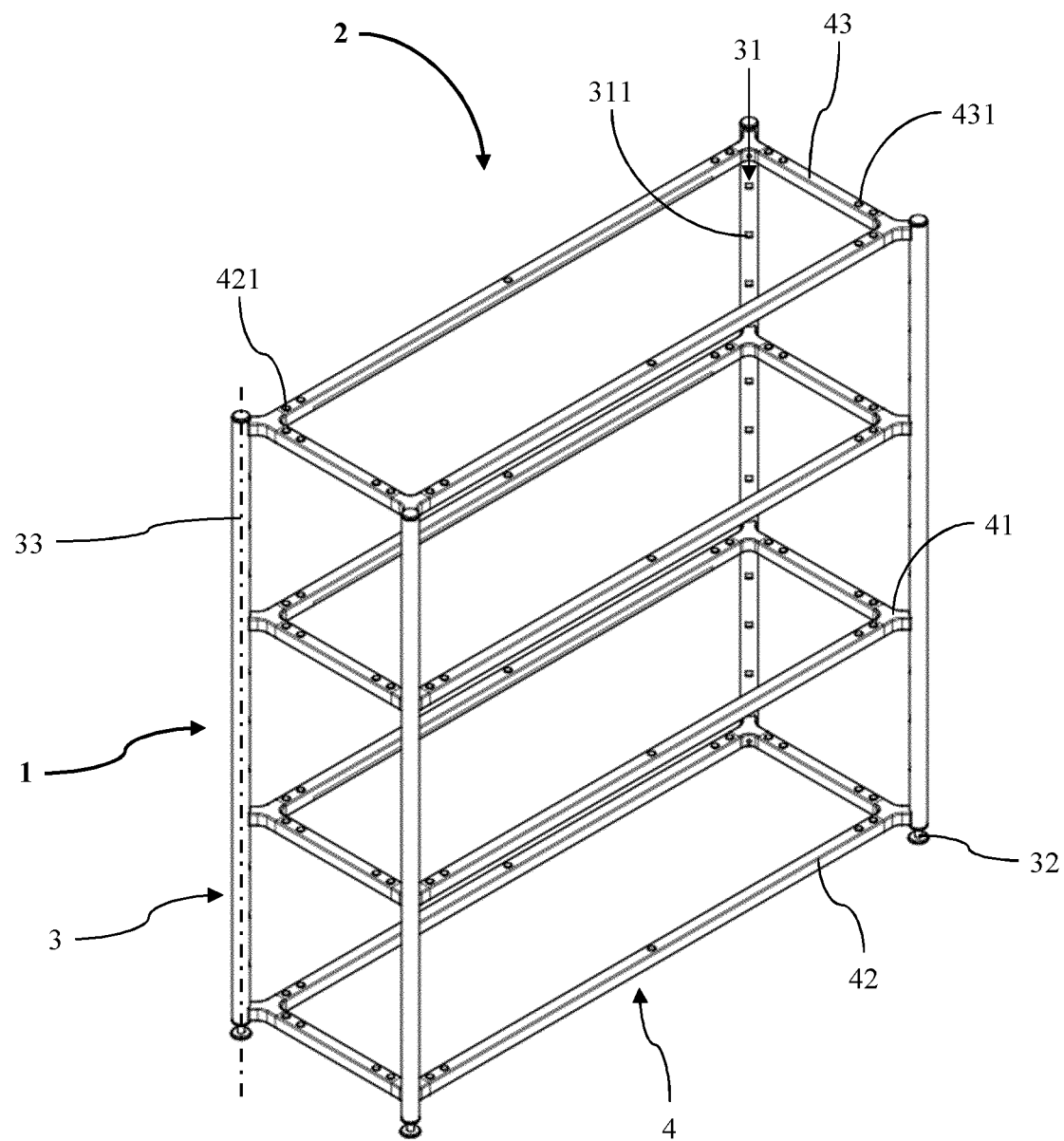
FIG. 1 is a perspective view of a first embodiment of a shelf according to the invention without single shelves, which shelf is constructed from an embodiment of a structural system according to the invention.

Certain terms are used in the following description for practical reasons and are not intended to be limiting. The words "right," "left," "below" and "above" indicate directions in the drawing to which reference is made. The terms "inward," "outward," "below," "above," "left," "right" or similar are used to describe the arrangement of designated parts relative to each other, the movement of designated parts relative to each other and the directions toward or away from the geometric center of the invention and designated parts thereof as shown in the drawings. This spatial relative information also comprises different positions and orientations from those shown in the drawings. For example, if a part shown in the drawings is reversed, elements or features that are described as "below" are then "above." The terminology comprises the words expressly mentioned above, derivatives thereof and words of similar meaning.

In order to avoid repetitions in the drawings and the associated description of the different aspects and embodiments, certain features are to be understood as common for different aspects and embodiments. The omission of an aspect in the description or a drawing does not suggest that this aspect is missing in the associated embodiment. Rather, such omission can serve for clarity and for preventing repetitions. In this context, the following specification applies to the entire further description: If reference signs are included in a drawing for the sake of clarity of the drawing, but are not mentioned in the directly associated description text, reference is made to the explanation thereof in the preceding description of the drawings. If reference signs are also mentioned in the description text belonging directly to a drawing which are not contained in the associated drawing, reference is made to the preceding and following drawings. Similar reference signs in two or more drawings represent similar or identical elements.

FIG. 1 shows a first embodiment of a shelf 1 according to the invention as a simple embodiment of a shelving structure. The shelf 1 is constructed from components of an embodiment of a structural system 2 according to the invention. The shelf 1 is constructed from four vertical supports 3 of the same length and four frames 4 of the structural system 2 of the same size.

The vertical supports 3 are each substantially designed in the form of a round tube with a central longitudinal axis 33. They each comprise a straight row of holes 31 extending along the longitudinal axis 33, each with thirteen regularly spaced individual holes 311. The holes 311 are each designed as an opening with a square cross section in a wall of the associated vertical strut 3. At the lower end, the vertical struts 3 are each equipped with a base 32 by means of which the vertical struts 3 can be placed on a floor.

The frames 4 are each assembled from two longer struts 42, two shorter struts 43 and four mounting corner pieces 41. In particular, a shorter strut 42 and a longer strut 42 are connected to one another at right angles via one of the mounting corner pieces 41. As a result, the frame 4 forms a substantially rectangular shape. The struts 42, 43 are formed from square tubes. Five receiving bores 421 are designed on the upper sides of the longer struts 42 as receptacles for a first alignment structure. In a similar way, the shorter struts 43 are each equipped on their upper sides with four receiving bores 431 as receptacles of the first alignment structure.

The mounting corner pieces 41 of the frames 4 are each secured to one of the vertical supports 3, as described in more detail below, so that the frame 4 and vertical supports 3 together form a stable, free-standing frame.

Figure 2:
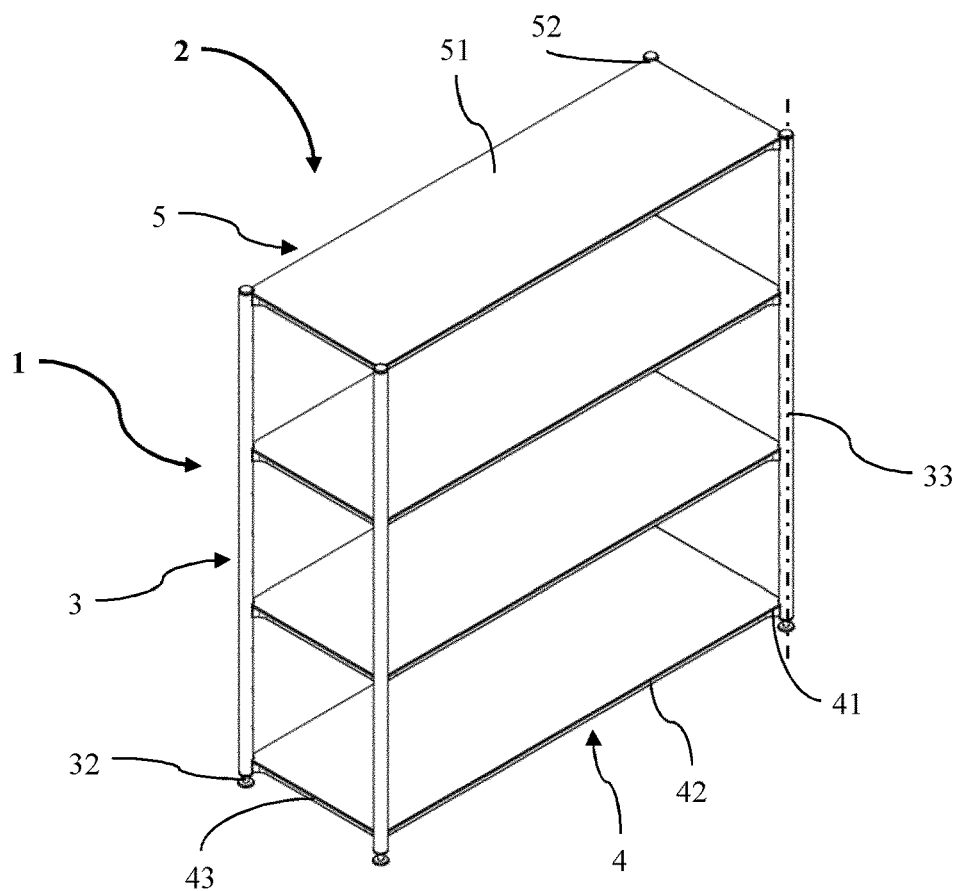
FIG. 2 is a perspective view of the shelf of FIG. 1 with associated single shelves.

FIG. 2 shows the shelf 1 having four introduced single shelves 5. In this case, a single shelf 5 is placed on each of the frames 4. The single shelves 5 are each designed more or less at right angles, being dimensioned such that they project somewhat beyond the frame 4 in length at the side.

They each have a flat surface 51 on which objects such as goods or the like can be set or placed. The single shelves 5 can be made of any suitable material such as glass, wood or metal.

On their undersides, the single shelves 5 are equipped with bolts as projections of a second alignment structure. In particular, each single shelf 5 has ten bolts which are dimensioned and positioned so that they are introduced into the receiving bores 421, 431 of the associated frame 4 when the single shelf 5 lies on the frame 4 as intended.

Figure 3:
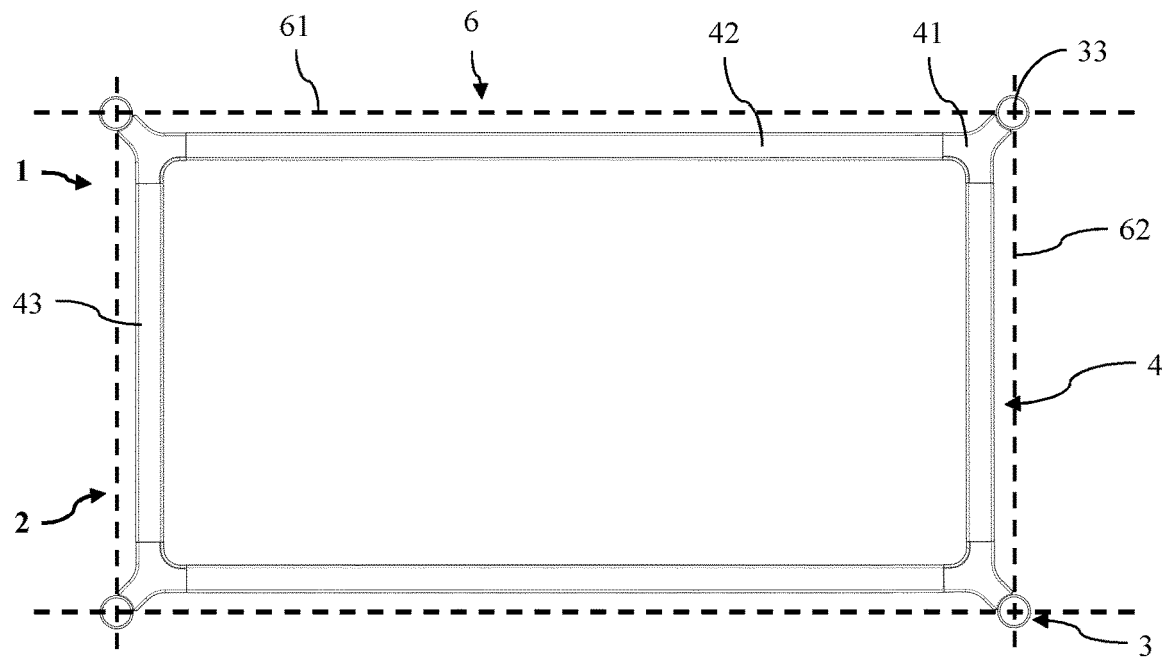
FIG. 3 is a view from above of the shelf of FIG. 1 without the single shelves.

FIG. 3 shows the shelf 1 from above without single shelves 5, so that a single frame 4 mounted on the four vertical supports 3 is visible. As will be described in more detail below, the mounting corner pieces 41 of the frame 4 are each more or less Y-shaped in plan view. The struts 42, 43 of the frame 4 are offset to the vertical supports 3 toward the inside. The vertical supports 3 define four support planes 6. In particular, two respective neighboring vertical supports 3 define one of the support planes 6 in such a way that the two parallel longitudinal axes 33 of the neighboring vertical supports 3 lie in the associated support plane 6.

The neighboring vertical supports 3 lying closer to one another define a transverse support plane 62 which is arranged parallel to the shorter struts 43 and at right angles to the longer struts 42. In an analogous manner, the neighboring vertical supports 3 which are further away from one another define a longitudinal support plane 61 which is arranged parallel to the longer struts 42 and at right angles to the shorter struts 43.

By moving the struts 42, 43 inwardly by means of the Y-shaped mounting corner pieces 41, the struts 42, 43 are arranged outside the support planes 6. In particular, they extend parallel to the support planes 6 offset by at least half the diameter of one of the vertical supports 3. As a result, the frame 4 can extend through further vertical supports 3 arranged at the same distance from one another, which offers new or further possibilities in the case of more complicated constructions than the shelf 1.

Figure 4:
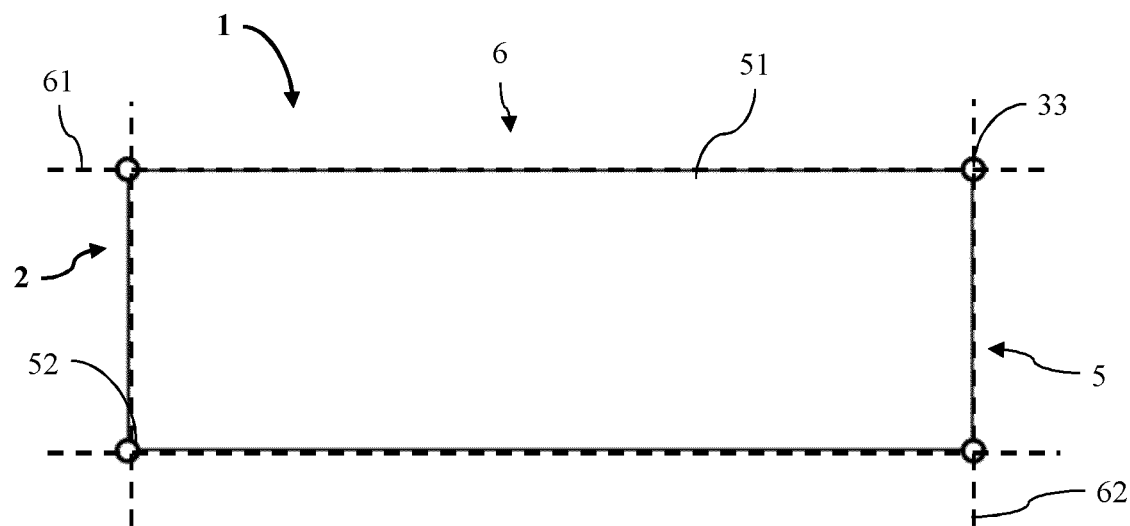
FIG. 4 is a view from above of the shelf of FIG. 1 with the single shelves.
Figure 8:
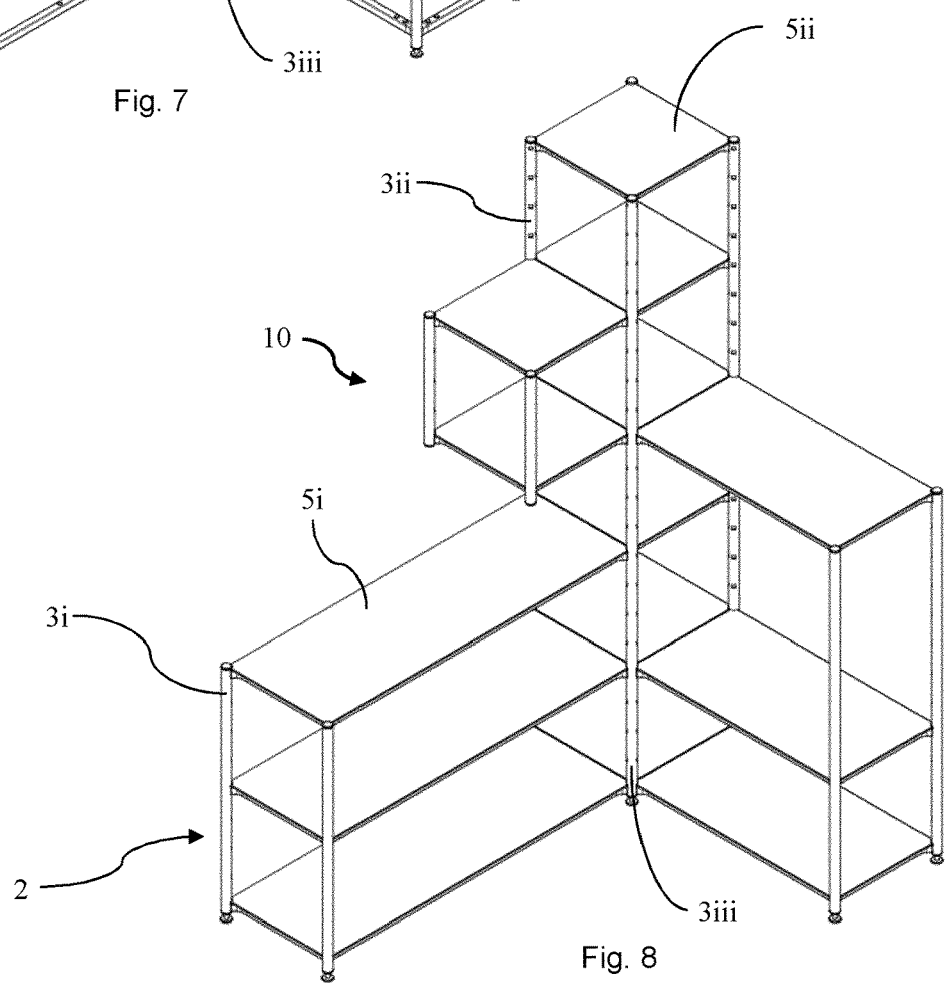
FIG. 8 is a perspective view of the shelf of FIG. 7 with associated single shelves.

FIG. 4 is a view from above of the shelf 1 having single shelves 5. It can be seen here that the edges of the single shelves 5 lie in or on the support planes 6. Each single shelf 5 ends at the support planes 6. The rectangular single shelves 5 have four corner pieces 52, each of which is cut out in the shape of a quarter circle. The cutouts of the corner pieces 52, which cutouts are in the shape of a quarter circle, are dimensioned and shaped according to the vertical supports 3 which are in the form of a round tube. In particular, these cutouts of the corner pieces 52 each have approximately the same radius as the vertical supports 3. In this way, the single shelves 5 can extend in the longitudinal and transverse direction up to about the center of the vertical supports 3. As can be seen in the embodiment of FIG. 8, this allows a closed surface to be formed when a plurality of single shelves 5 are installed neighboring to one another at the same height.

Figure 5:
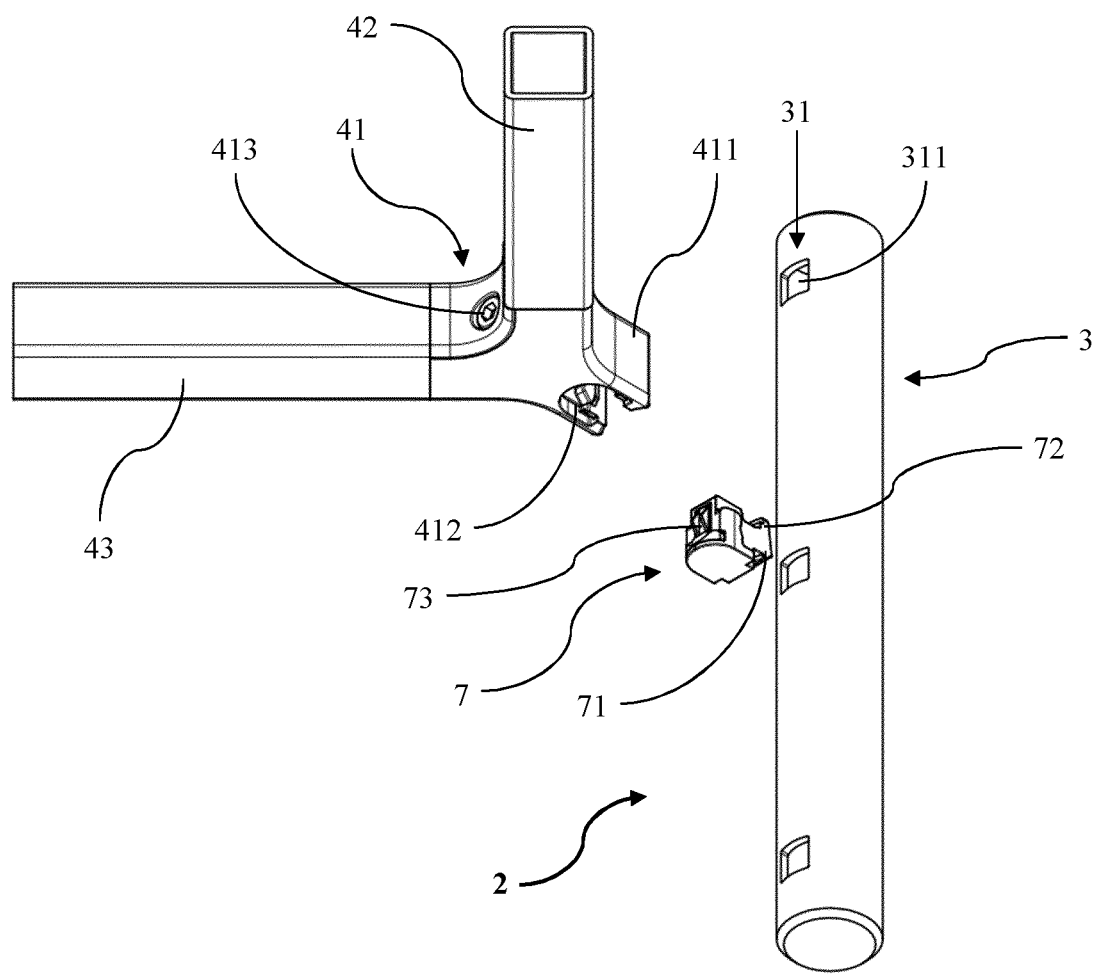
FIG. 5 is a perspective view from above of cutouts of components of the structural system of FIG. 1.
Figure 6:
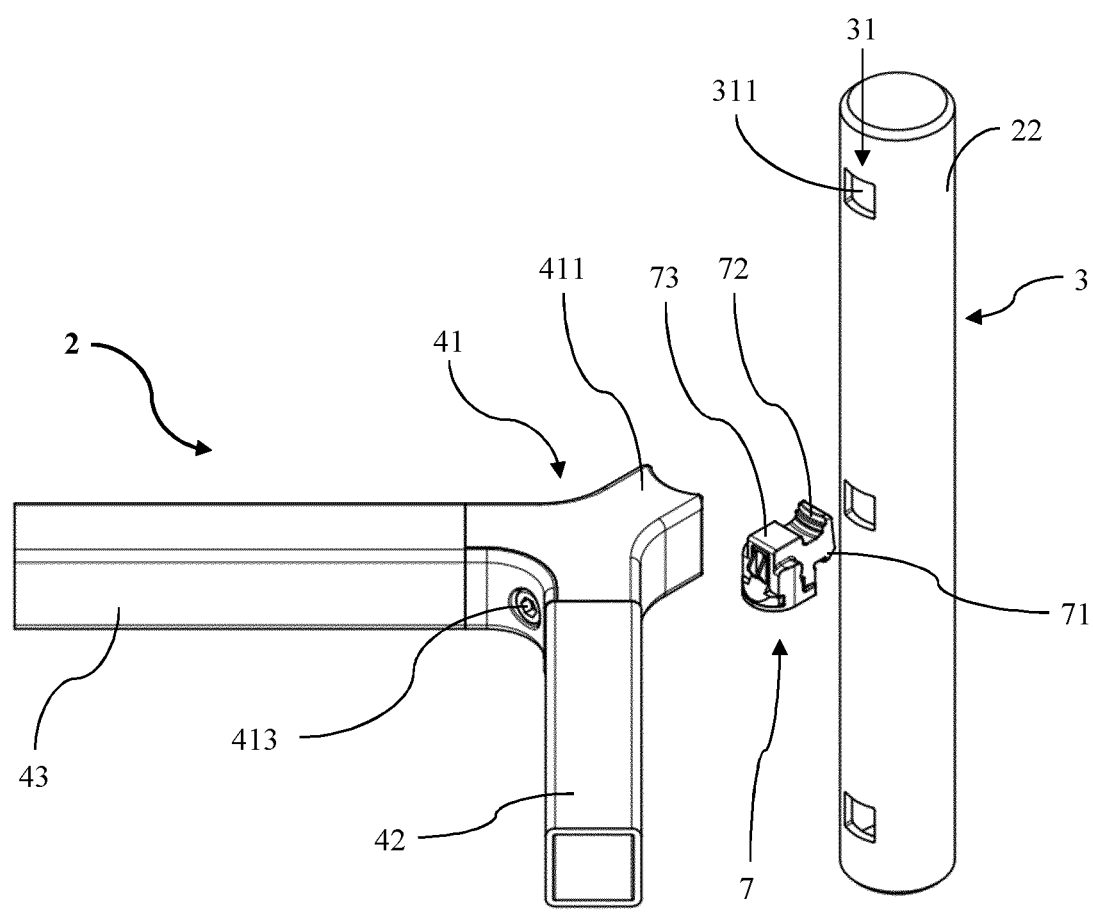
FIG. 6 is a perspective view from below of the cutouts of components of FIG. 5.

FIGS. 5 and 6 show an example of a mounting corner piece 41 of the frame 4 in detail. The mounting corner piece 41 comprises a strut portion at right angles to which two of the struts 42, 43 are fixed. A connection extension 411 protrudes diagonally from the strut portion, so that the mounting corner piece 41 is more or less Y-shaped. A receptacle 412 which is open at the bottom is designed on the connection extension 411.

To secure the mounting corner piece 41, the structural system 2 comprises a plurality of connectors 7. The connectors 7 each have a base body 73 from which a hooking portion protrudes. The hooking portion is equipped with a hook 71 opening downward and a lug 72 extending upward.

When it is secured, the connector 7 is mounted on the vertical support 3 by the hooking portion being introduced into a hole 311 at a suitable height. The hook 71 grips the lower edge of the hole 311, and the lug 72 extends behind the upper edge of the hole 311. The lug 72 thus engages behind the upper edge of the hole 311 vertically upward.

When the connector 7 is introduced into the hole 311, the mounting corner piece 41 or the frame 4 is placed on the connector 7. The base body 73 is introduced into the receptacle 412 of the mounting corner piece 41. As a result, the mounting corner piece 41 and also the frame 4 are securely secured to the connector 7 and thus to the vertical support 3. If desired, the mounting corner piece 41 can also be clamped to the connector 7 via a clamping screw 413. In particular, it can be expedient to clamp the mounting corner pieces 41 of two frames 4 to the associated vertical supports 3 in this way. A very high level of stability on the shelf 1 can be achieved as a result.

A variant of the vertical support 3 having a row of holes 31 and of the same length as mentioned above is exclusively used for the shelf 1 shown in FIGS. 1 to 6. However, the structural system 2 also comprises other variants of vertical supports 3, which variants can be used if required. In particular, it may be desirable, for example, to install vertical supports 3 having more than one row of holes 31 and of various lengths. The analogous variants of vertical supports with a single row of holes 31 as vertical support 3*i*, with two rows of holes 31 as vertical support 3*ii* and with three rows of holes 31 as vertical support 3*iii* are referred to below in connection with a further embodiment of the shelf 10 according to the invention. The vertical supports 3*i*, 3*ii* and 3*iii* are identical except for the number of rows of holes 31, possibly the equipment with various power supplies and possibly their length.

Figure 7:
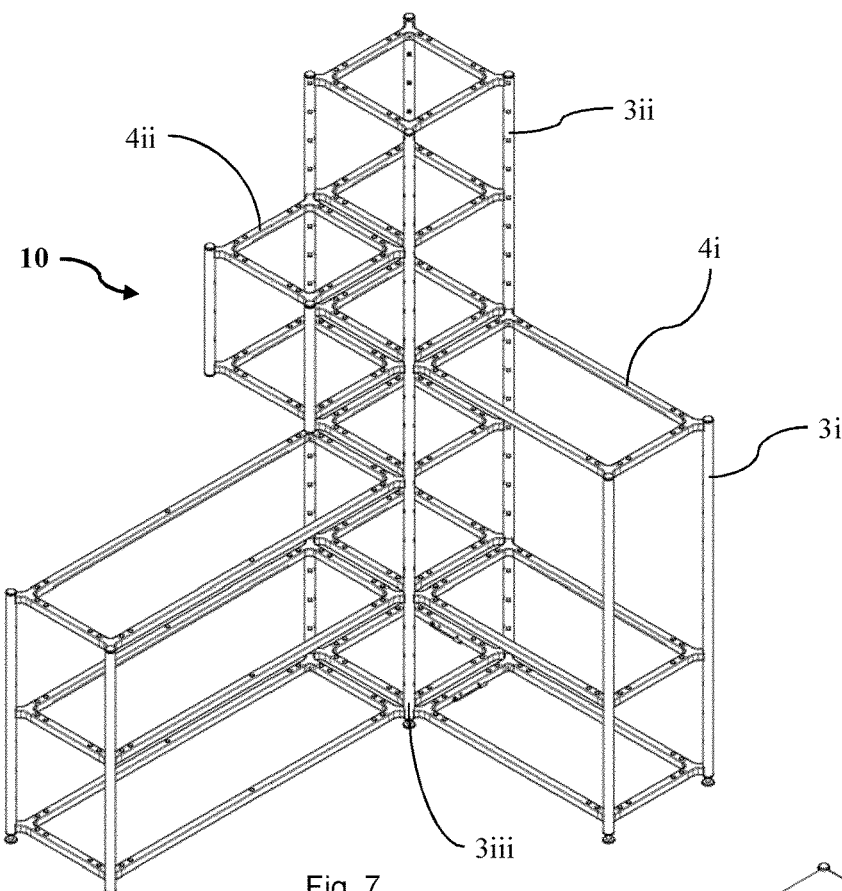
FIG. 7 is a perspective view of a second embodiment of a shelf according to the invention without single shelves, which shelf is constructed from the structural system of FIG. 1.

FIG. 7 shows the second embodiment of a shelf 10 according to the invention constructed from the structural system 2. In particular, it is constructed from seven vertical supports 3*i* with one row of holes, two vertical supports 3*ii* with two rows of holes, one vertical support 3*iii* with three rows of holes, six large frames 4*i*, eight small frames 4*ii* and fifty-eight connectors. The vertical supports 3*i* include two vertical supports 3*i* of one shelving unit height, two vertical supports 3*i* of two shelving unit heights, two vertical supports 3*i* of three shelving unit heights and one vertical support 3*i* of five shelving unit heights. The vertical supports 3*ii* and the vertical supports 3*iii* each have a length of five shelving unit heights. The shelving unit height can, for example, correspond approximately to the height of a folder that has been set up.

The frames 4*i*, 4*ii* are each connected to four vertical supports 3*i*, 3*ii*, 3*iii* by their mounting corner pieces via four connectors. The connectors are hooked into the matching holes at the desired heights, and the frames 4*i*, 4*ii* are plugged onto the four associated connectors. At least some of the connectors are designed to tap power inside the associated vertical support 3*i*, 3*ii*, 3*iii* and to conduct it to the associated frame 4*i*, 4*ii*.

FIG. 8 shows the shelf 10 in the final configuration. In particular, it also comprises six large single glass shelves 5*i*, eight small single glass shelves 5*ii* as single shelves. The single glass shelves 5*i*, 5*ii* are dimensioned according to the frames 4*i*, 4*ii* and placed thereon or connected thereto.

Although the invention is illustrated and described in detail by means of the drawings and the associated description, this illustration and this detailed description are to be understood as illustrative and exemplary and not as limiting the invention. In order not to transfigure the invention, in certain cases well-known structures and techniques cannot be shown and described in detail. It is understood that persons skilled in the art can make changes and modifications without departing from the scope of the following claims. In particular, the present invention covers further embodiments with any combination of features that may differ from the combinations of features explicitly described.

The present disclosure also comprises embodiments with any combination of features mentioned or shown above or below for various embodiments. It also comprises individual features in the drawings, even if they are shown there in connection with other features and/or are not mentioned above or below. The alternatives of embodiments and individual alternatives of the features thereof that are described in the drawings and the description can be excluded from the subject matter of the invention or from the disclosed subject matter. The disclosure comprises embodiments that only comprise the features described in the claims or in the embodiments and also those that comprise additional different features.

Furthermore, the term "comprise" and derivatives thereof do not exclude other elements or steps. Likewise, the indefinite article "a" or "an" and derivatives thereof do not exclude a plurality. The functions of a plurality of features listed in the claims can be fulfilled by a unit or a step. The mere fact that certain measures are listed in different dependent claims does not mean that a combination of those measures cannot be used advantageously. The terms "substantially," "about," "approximately," and the like in connection with a property or a value in particular also define exactly the property or exactly the value. The terms "about" and "approximately" in connection with a given numerical value or range can refer to a value or range which lies within 20%, within 10%, within 5% or within 2% of the given value or range.

What is claimed is:

1. A structural system for modular construction of shelves, comprising:
    a set of elongate vertical supports, each vertical support having at least one axially extending row of holes;
    a set of frames, each frame of the set of frames having four struts, of which two struts are connected to one another via a mounting corner piece of the frame; and
    a set of connectors, each connector of the set of connectors being configured to be inserted into a hole of a respective vertical support of the set of vertical supports and secured to a respective mounting corner piece of the mounting corner pieces of a respective frame of the set of frames,
    wherein the structural system is configured such that, in an assembled state,
        at least one frame of the set of frames is secured by mounting corner pieces of the at least one frame to four vertical supports via respective connectors,
        two respective neighboring vertical supports that are connected to one another via one of the struts of the at least one frame define a support plane, and
        the four struts of the at least one frame lie outside the support planes defined by the four vertical supports connected to the frame.

2. The structural system according to claim 1, wherein each of the mounting corner pieces of the frames
    interconnects two struts substantially at right angles, so that the mounting corner piece defines an external angle of substantially 270°, and
    has a connection extension which extends substantially in a direction of a bisecting line of the external angle.

3. The structural system according to claim 2, wherein each of the mounting corner pieces of the frames is equipped with a receptacle that is configured for vertical introduction of one of the connectors.

4. The structural system according to claim 3, wherein the receptacle is arranged on the connection extension.

5. The structural system according to claim 3, wherein a respective frame of the set of frames is configured to be secured to four vertical supports of the set of vertical supports by a respective connector mounted on each of the four vertical supports being introduced into a respective receptacle of each of the mounting corner pieces of the respective frame.

6. The structural system according to claim 1, wherein each of the mounting corner pieces of at least two of the frames of the set of frames is equipped with a clamping mechanism that is configured to clamp the associated frame to the vertical support to which the associated frame is secured via a connector.

7. The structural system according to claim 1, wherein the frames of the set of frames are configured to be identical except for a length of the struts.

8. The structural system according to claim 1, comprising a set of single shelves, each shelf being adapted to be placed on one of the frames when mounted on the vertical supports.

9. The structural system according to claim 8, wherein each shelf of the set of single shelves is substantially rectangular.

10. The structural system according to claim 8, wherein each of the single shelves comprises four corner pieces, and wherein each corner piece is configured to partially encompass one of the vertical supports.

11. The structural system according to claim 8, wherein
    the struts of the frames are equipped with first alignment structures, and the single shelves are equipped with second alignment structures, and
    the first alignment structures of the frames and the second alignment structures of the single shelves are configured so that the single shelves can be placed on the frames in a predefined position.

12. The structural system according to claim 11, wherein the first alignment structures have receptacles, and the second alignment structures have projections matching the receptacles.

13. The structural system according to claim 1, wherein each of the connectors has a hook portion which is configured to be hooked into one of the holes of one of the vertical supports.

14. The structural system according to claim 1, wherein the set of vertical supports comprises at least one vertical support having a plurality of axially extending rows of holes.

15. The structural system according to claim 1, wherein the set of vertical supports comprises at least one vertical support having a single row of holes extending along the at least one vertical support.

16. The structural system according to claim 1, wherein the set of vertical supports comprises at least one vertical support having exactly two rows of holes extending along the at least one vertical support.

17. The structural system according to claim 1, wherein the set of vertical supports comprises at least one vertical support having exactly three rows of holes extending along the at least one vertical support.

18. The structural system according to claim 1, wherein the set of vertical supports comprises at least one vertical support having exactly four rows of holes extending along the at least one vertical support.

19. The structural system according to claim 1, wherein each of the vertical supports has a circular outer circumference in cross section.

20. The structural system according to claim 19, wherein each of the vertical supports comprises a tubular body shaped as a round tube.

21. A shelf constructed from a structural system according to claim 1.

* * * * *